United States Patent
German

[11] 3,910,541
[45] Oct. 7, 1975

[54] SPARK PLUG HOLDER

[76] Inventor: Ronald L. German, 5131 Blairwood Dr., LaPalma, Calif. 90623

[22] Filed: June 18, 1974

[21] Appl. No.: 480,499

[52] U.S. Cl............... 248/231; 248/226 R; 248/314
[51] Int. Cl.² .......................................... F16M 13/00
[58] Field of Search ....... 248/40, 43, 204, 230, 231, 248/314, 74 PB, 226 R

[56] References Cited
UNITED STATES PATENTS

| | | | |
|---|---|---|---|
| 593,018 | 11/1897 | Hughes................................. | 248/43 |
| 988,434 | 4/1911 | Blundon et al................ | 248/314 UX |
| 1,457,234 | 5/1923 | Strout............................. | 248/314 X |
| 3,734,439 | 5/1973 | Wintz............................. | 248/314 X |

FOREIGN PATENTS OR APPLICATIONS

| | | | |
|---|---|---|---|
| 1,126,130 | 7/1956 | France.............................. | 24/30.5 P |
| 917,217 | 8/1954 | Germany........................... | 24/30.5 P |
| 430,448 | 6/1926 | Germany............................ | 248/314 |

*Primary Examiner*—William H. Schultz
*Attorney, Agent, or Firm*—Clarence A. O'Brien; Harvey B. Jacobson

[57] ABSTRACT

A body of shape retentive, but deformable and elastic material is provided and one side of the body includes a blind bore opening outwardly thereof in which to snugly and frictionally receive the threaded base end of a spark plug for support of the spark plug from the holder. A second adjacent side of the body includes spaced parallel integral leg portions projecting outwardly thereof and the free end of one of the legs is provided with an endwise outwardly projecting integral stem portion terminating outwardly in an integral eye portion. The free end of the other leg terminates outwardly in a second integral stem portion projecting endwise outwardly therefrom and the outer end of the second stem portion includes an integral crosshead insertable through the eye portion. The legs are adapted to embracingly receive a tubular structural member of a motorcycle frame therebetween and the free ends of the legs and the stems are adapted to be bent around the opposite side of the tubular structural member with the crosshead removably inserted through the eye portion. With the legs and stem or stem portions of the holder thus secured about the motorcycle frame structural member in a slightly stretched condition, the holder is frictionally retained on the motorcycle frame tubular member and a spark plug supported from the holder is supported in readiness for use as a spare spark plug in the event a spare spark plug is needed.

3 Claims, 4 Drawing Figures

U.S. Patent Oct. 7,1975 3,910,541

SPARK PLUG HOLDER

BACKGROUND OF THE INVENTION

In many instances, and especially with the increasing popularity of two-stroke cycle engine powered motorcycles, it becomes necessary to replace one or more spark plugs of a motorcycle engine while touring or travelling over long distances. While replacement of a fouled spark plug with a new spark plug is not always required in the event of less than optimum performance from a spark plug, inasmuch as some fouled spark plugs may be renewed by cleaning to a capacity of substantially optimum performance, proper spark plug cleaning may not be accomplished without the utilization of special machines designed specifically to perform spark plug cleaning operations. Therefore, since such spark plug cleaning machines are not always be immediately available, in the event of malfunction of a spark plug which merely needs to be cleaned, the most expedititious manner of correcting malfunction of the motorcycle engine is to replace that spark plug.

Some motorcycles are provided with enclosures in which simple tools and replacement spark plugs may be stored while others are not. Furthermore, storage of a spark plug in a compartment provided for simple tools can sometimes result in the spark plug being damaged by jarring against tools within the same compartment with the result that the damaged spark plug, when needed to replace a malfunctioning spark plug, is not capable of optimum performance.

Accordingly, a need exists for a structure by which a spare spark plug may be supported in stored position on a motorcycle and in a manner such that the spare spark plug will be stored without danger of damage to the spare spark plug.

Heretofore, various types of holders have been designed for the purpose of supporting various articles from different types of support structures. Examples of some of these prior art article supports or holders may be found in U.S. Pat. Nos. 501,392 to H. C. Wiedenmann, dated July 11, 1893, 2,191,782 to E. O. Valane, dated Feb. 27, 1940, 2,558,768 to G. M. McCormick, dated July 3, 1951, 2,703,359 to D. B. Miller, dated Mar. 1, 1955, and 3,568,980 to Robert S. Hulburt, dated Mar. 9, 1971. However, these previously patented article holders are not constructed with the specific purpose of supporting a spare spark plug from a motorcycle frame tubular member and, therefore, are not capable of functioning in an efficient manner to perform such a purpose.

BRIEF DESCRIPTION OF THE INVENTION

The spark plug holder of the instant invention includes a resilient one-piece body constructed of rubber or other similar material provided with a blind bore opening outwardly of one side thereof to which to frictionally receive the threaded base of a spare spark plug for support of the spark plug from the body. An adjacent side of the body includes spaced parallel integral leg portions adapted to be secured about a tubular structural member of a motorcycle.

The main object of this invention is to provide a spark plug holder for a motorcycle, or similar vehicle, constructed in a manner whereby a spare spark plug may be supported from that vehicle in an efficient and substantially fully protected manner for use, whenever desired, as a replacement for one of the spark plugs of the engine of the vehicle.

Another object of this invention, in accordance with the immediately preceding object is to provide an article holder which may be readily used on substantially all motorcycles.

Still another object of this invention is to provide a motorcycle holder which may be readily constructed with various portions thereof of different sizes so as to be adapted for use in conjunction with spark plugs having different size bases and on motorcycles having tubular structural members of different sizes.

A final object of this invention to be specifically enumerated herein is to provide a spark plug holder which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
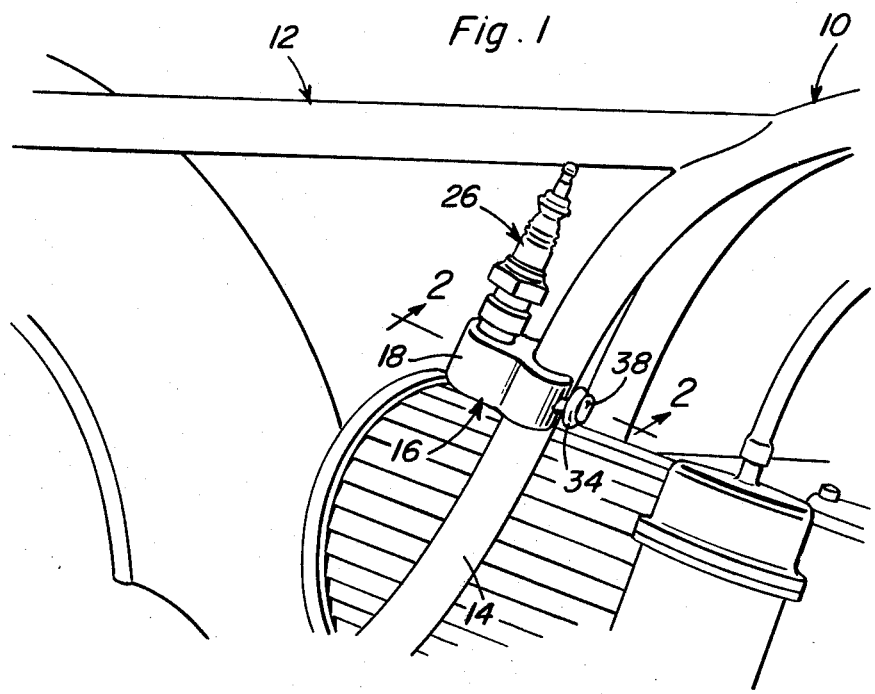
FIG. 1 is a fragmentary, perspective view of a motorcycle frame with the spark plug holder of the instant invention supported from a portion of the motorcycle frame and in use supporting a spare spark plug therefrom.

Referring now more specifically to the drawings, the numeral 10 generally designates a motorcycle which includes a frame referred to in general by the reference numeral 12. The frame 12 includes a tubular structural member 14.

The spark plug holder of the instant invention is referred to in general by the reference numeral 16 and comprises a one-piece body 18 constructed of shape retentive, but deformable and elastic material, such as rubber or neoprene. The body 18 includes a first upper side 20 thereof and a blind bore 22 which opens upwardly through the upper side 20. The blind bore 22 is of a diameter slightly smaller than the diameter of the threaded base portion 24 of the spark plug referred to in general by the reference numeral 26 and thus those portions of the body 18 defining the bore 22 must be slightly expanded in order to receive the threaded base portion 24 of the spark plug 26 therein.

The body 18 includes an upstanding side 27 adjacent the upper side 20 including a pair of outstanding integral, spaced and parallel legs 28 and 30. The leg 28 terminates outwardly projecting in an endwise outwardly reduced cross-sectional area stem 32 and the outer end of the stem 32 includes an integral horizontally disposed eye portion 34. Further, the free end of the leg 30 includes an integral reduced cross-sectional area stem 36 similar to the stem 32 projecting endwise outwardly of the free end of the leg 30 and the outer end of the stem 36 includes an integral crosshead 38.

Figure 2:
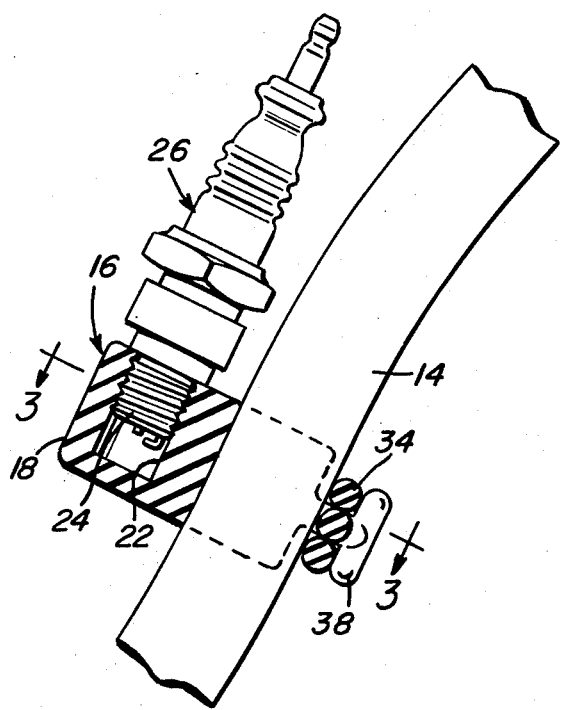
FIG. 2 is an enlarged fragmentary, vertical, sectional view taken substantially upon the plane indicated by the section line 2—2 of FIG. 1.
Figure 3:
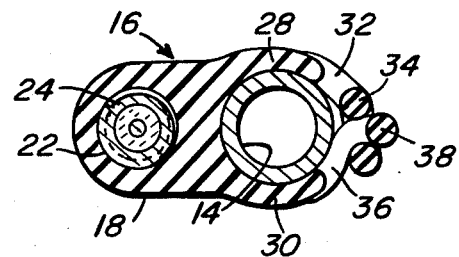
FIG. 3 is a sectional view taken substantially upon the plane indicated by the section line 3—3 of FIG. 2.
Figure 4:
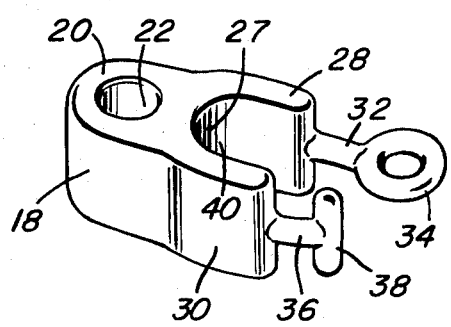
FIG. 4 is a perspective view of the spark plug holder.

In use, the spark plug 26 is positioned with its threaded base portion 24 in the bore 22 in the manner illustrated in FIGS. 1, 2 and 3 of the drawings and the body 18 is then placed against the structural member 14 with one semi-cylindrical side of the structural member 14 snugly seated in the outwardly semi-cylindrical pocket 40 defined between the base ends of the legs 28 and 30. Then, outward force is simultaneously applied to the eye portion 34 and the crosshead 38 to stretch the legs 28 and 30 as well as the stem portions 32 and 36 and the crosshead 38 is inserted through the eye portion 34 after the latter has been rotated approximately 90° about the longitudinal center axis of the stem 32. In this manner, the holder 16 is secured to the structural member 14 in the manner illustrated in FIGS. 1, 2 and 3 of the drawings. The holder 16 is clamped about the structural member 14 against shifting relative thereto and the spark plug 26 is supported in spaced relation relative to the support member and with the threaded base portion 24 thereof fully enclosed against protection from the elements as well as road grime and dust.

Thus, when it is desired to change a spark plug of the motorcycle 10, the spark plug to be changed is first removed and the spark plug 26 is then readily withdrawn from the blind bore 22 and used as a replacement for the spark plug removed from the engine of the motorcycle 10. The spark plug 26 may, of course, be properly gapped before being placed in the holder 16 and thus ready for instant use whenever desired. Further, the holder 16 provides a convenient holder for the replaced spark plug until such time as it may be replaced or cleaned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An article holder for securement about an elongated member, said holder comprising a one piece body of shape retentive, deformable and elastic material and including article support means for supporting an article therefrom, said body further including spaced generally parallel integral leg portions of panel-like configuration projecting endwise outward from one side thereof, the free end of one of said leg portions including an integral endwise outwardly projecting stem whose free outer end terminates in an integral eye portion and the free end of the other leg portion including a similar integral endwise outwardly projecting stem whose outer end terminates in an integral crosshead removably insertable through said eye portion, the portion of the side of said body outwardly from which said leg portions project being contoured to define a semi-cylindrical pocket opening laterally outwardly between said leg portions, said leg portions being disposed in planes paralleling the center axis of said semi-cylindrical pocket, said pocket defining an abutment surface against which one side of a cylindrical structural member may be abutted, the effective length of said leg portions and their stems being such, when said leg portions and stems are slightly elongated and bowed, to allow the stems to be secured together by insertion of said crosshead through said eye portion and to define, together with said pocket, a cylindrical area therebetween of substantially the same radius of curvature as the radius of curvature of said pocket, said body having a bore formed therein opening outwardly through another side of the body, said bore being of a diameter adapted to wedgingly receive the threaded base of a spark plug therein.

2. The combination of claim 1 wherein said stems each comprise an extension of the corresonding leg portion of reduced cross-sectional area.

3. The combination of claim 1 wherein said bore comprises a blind bore generally paralleling said pocket.

* * * * *